(12) United States Patent  (10) Patent No.: US 8,551,394 B2
Jordan et al.  (45) Date of Patent: Oct. 8, 2013

(54) MULTI-MODAL IONOMERIC GOLF BALL COMPOSITIONS

(75) Inventors: Michael D. Jordan, East Greenwich, RI (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 787 days.

(21) Appl. No.: 11/135,450

(22) Filed: May 24, 2005

(65) Prior Publication Data

US 2006/0267244 A1    Nov. 30, 2006

(51) Int. Cl.
*B29C 59/00*    (2006.01)

(52) U.S. Cl.
USPC ........................................... 264/504

(58) Field of Classification Search
USPC ............... 264/259, 328.1, 504; 473/378
See application file for complete search history.

(56) References Cited

U.S. PATENT DOCUMENTS

| | | | |
|---|---|---|---|
| 3,262,272 A | 7/1966 | Barakauskas et al. | 60/39.05 |
| 4,431,193 A | 2/1984 | Nesbitt | 273/235 R |
| 4,560,168 A | 12/1985 | Aoyama | 273/232 |
| 4,884,814 A | 12/1989 | Sullivan | 273/235 R |
| 4,911,451 A | 3/1990 | Sullivan et al. | 273/235 R |
| 4,960,281 A | 10/1990 | Aoyama | 273/232 |
| 5,334,673 A | 8/1994 | Wu | 273/235 R |
| 5,484,870 A | 1/1996 | Wu | 528/28 |
| 5,688,191 A | 11/1997 | Cavallaro et al. | 473/373 |
| 5,692,974 A | 12/1997 | Wu et al. | 473/377 |
| 5,713,801 A | 2/1998 | Aoyama | 473/354 |
| 5,803,831 A | 9/1998 | Sullivan et al. | 473/374 |
| 5,849,168 A | 12/1998 | Lutz | 264/755 |
| 5,885,172 A | 3/1999 | Hebert et al. | 473/354 |
| 5,908,358 A | 6/1999 | Wu | 473/378 |
| 5,919,100 A | 7/1999 | Boehm et al. | 473/354 |
| 5,965,669 A | 10/1999 | Cavallaro et al. | 525/221 |
| 5,981,654 A | 11/1999 | Rajagopalan | 525/66 |
| 5,981,658 A | 11/1999 | Rajagopalan et al. | 525/72 |
| 5,994,472 A * | 11/1999 | Egashira et al. | 525/221 |
| 6,056,842 A | 5/2000 | Dalton et al. | 156/243 |
| 6,149,535 A | 11/2000 | Bissonnette et al. | 473/354 |
| 6,180,040 B1 | 1/2001 | Ladd et al. | 264/248 |
| 6,180,722 B1 | 1/2001 | Dalton et al. | 525/193 |
| 6,207,784 B1 | 3/2001 | Rajagopalan | 528/71 |
| 6,386,992 B1 | 5/2002 | Harris et al. | 473/371 |
| 6,503,156 B1 | 1/2003 | Sullivan | 473/374 |
| 6,506,130 B2 | 1/2003 | Sullivan | 473/374 |
| 6,562,906 B2 | 5/2003 | Chen | 525/191 |
| 6,632,147 B2 | 10/2003 | Cavallaro et al. | 473/374 |
| 6,762,246 B2 | 7/2004 | Chen | 525/194 |
| 7,175,543 B2 | 2/2007 | Kennedy, III et al. | 473/374 |
| 2004/0132552 A1* | 7/2004 | Chen | 473/378 |

OTHER PUBLICATIONS

U.S. Patent Publication No. 2004/0132552 A1.
U.S. Patent Publication No. 2003/0225197.

(Continued)

*Primary Examiner* — Larry Thrower

(74) *Attorney, Agent, or Firm* — Smith, Gambrell & Russell, LLP

(57) ABSTRACT

Compositions for golf balls including multi-modal ionomers that can be used in any layer of a golf ball, e.g., an outer cover layer or inner cover layer. The compositions of the invention can be a blend of a multi-modal ionomer and a conventional ionomer, highly neutralized polymer, acid copolymer, or other suitable thermoplastic polymer.

20 Claims, 2 Drawing Sheets

(56) References Cited

OTHER PUBLICATIONS

U.S. Patent Publication No. 2003/0078348.
U.S. Patent Publication No. 2002/0028885.
U.S. Patent Publication No. 2002/0025862.
U.S. Patent Publication No. 2001/0019971.
U.S. Patent Publication No. 2001/0018375.
U.S. Patent Publication No. 2001/0009310 A1.
U.S. Appl. No. 10/875,725, filed Jun. 25, 2004 entitled "Golf Ball Compositions Neutralized with Ammonium-Based and Amine-Based Compounds".
U.S. Patent Publication No. 2006/0094539.
Non-Final Office Action dated Aug. 3, 2010 of corresponding U.S. Appl. No. 12/123,949.
U.S. Patent Publication No. 2006/0105858.
Final Office Action dated Mar. 11, 2011 of corresponding U.S. Appl. No. 12/123,949.
Non-Final Office Action dated Oct. 7, 2011 of corresponding U.S. Appl. No. 12/123,949.
Final Office Action dated May 8, 2012 of corresponding U.S. Appl. No. 12/123,949.

* cited by examiner

MULTI-MODAL IONOMERIC GOLF BALL COMPOSITIONS

FIELD OF THE INVENTION

The present invention relates to compositions for golf balls including multi-modal ionomers. In particular, the multi-modal ionomeric compositions of the invention may be used in any layer of a golf ball, e.g., an outer cover layer or inner cover layer. In addition, the compositions of the invention can be a blend of a multi-modal ionomer and a conventional ionomer, highly neutralized polymer, acid copolymer, or other suitable thermoplastic polymer.

BACKGROUND OF THE INVENTION

Ionomer resin materials are generally used for their durability in golf ball inner cover and outer cover layers. For example, when golf balls include an outer cover layer formed from a conventional ionomeric material, the golf ball provides a good combination of distance and durability. But, because conventional ionomer-covered golf balls have a hard "feel" and lower spin rate when struck with a club, golf ball manufacturers typically replace the ionomer cover with a softer cover formed from polyurethane or polyurea. The softness of the polyurethane and polyurea materials is generally balanced with a harder inner cover or intermediate layer. However, golf ball covers made from polyurethane have not, to date, fully matched ionomer-covered golf balls with respect to resilience or the rebound of the golf ball cover In addition to polyurethane, there are generally two other ways to obtain a soft golf ball cover. First, a very low modulus ionomer (VLMI) can be used to make a cover with a low compression, i.e., a soft "feel". In fact, U.S. Pat. No. 4,431, 193 relates to a golf ball having a multilayer cover wherein the inner layer is a hard, high flexural modulus ionomer resin and the outer layer is a soft, low flexural modulus ionomer resin. While the VLMI provides a soft cover, the coefficient of restitution is also very low, which results in a "dead" feeling when struck with a club. Blends of ionomers and noniono-mers, e.g., grafted metallocene-catalyzed polyolefins, such as those disclosed in U.S. Patent Publication No. 2003/0078348, have also been used to produce soft cover layers in golf balls?: Less material is typically required to obtain the desired degree of softness when FUSABOND®, a series of maleic anhydride grafted ethylene-butene or ethylene-octene metallocene catalyzed copolymers commercially available from DuPont having flexural modulus values between about 2000 psi and 3000 psi, is used as a cover layer as compared to a VLMI resin. In addition, the use of FUSABOND®, or a similar material, results in a golf ball with a good balance of speed and spin. Due to the hydrophobic nature of the polymer backbone, however, it is essential that good mixing is achieved to enhance compatibility between FUSABOND® and conventional ionomers and to avoid processing problems. Moreover, there is increased potential for delamination due the metallocene's absorption of moisture.

Thus, it would be advantageous to produce a composition that reduces processing and compatibility issues, provides increased adhesion to other materials, results in a good balance of speed and spin, and delivers a softer "feel" when struck with a club compared to conventional ionomer resins. In addition, there remains a need in the golf ball art for a material that provides a good balance of softness, e.g., low flexural modulus, and resiliency. The present invention provides a composition that is resilient, but soft, and, in addition, golf balls formed with the compositions of the invention have reduced processing issues, and increased adhesion to other golf ball layers.

SUMMARY OF THE INVENTION

The present invention is directed to a golf ball with a core having a diameter of about 1.50 inches to about 1.60 inches and a cover having a thickness of about 0.03 to about 0.07 inches, wherein the cover is formed from a composition including a multi-modal ionomer comprising a first copolymer having a molecular weight of about 70,000 or greater, preferably about 75,000 psi to about 400,000 psi, and a second copolymer having a molecular weight of about 40,000 or less, preferably about 1,500 psi to about 35,000 psi, wherein the multi-modal ionomer has a flexural modulus of about 5,000 psi to about 25,000 psi after 2 weeks. In one embodiment, the first and second copolymers are independently acid-containing ethylene copolymers having at least a portion of the acid groups neutralized. In another embodiment, the composition includes a thermoplastic polymer selected from the group consisting of ionomers, acid copolymers, highly neutralized polymers, and mixtures thereof and the multi-modal ionomer is present in an amount of about 10 percent to about 80 percent by weight of the composition.

The golf ball of the invention may further include an intermediate layer disposed between the core and the cover, wherein the intermediate layer has a hardness of about 60 Shore D to about 75 Shore D and a flexural modulus of about 60,000 to about 100,000 psi. In the alternative, the golf ball may include a center and an outer core layer, and wherein the cover comprises an inner cover layer and an outer cover layer. In one embodiment, the outer cover layer is formed from the composition, and the inner cover layer has a hardness of about 40 Shore D to about 70 Shore D and a flexural modulus of about 60,000 psi to about 100,000 psi.

The present invention also relates to a golf ball including a core having a diameter of about 1.50 inches to about 1.60 inches, an optional intermediate layer, and a cover having a thickness of about 0.03 to about 0.07 inches, wherein at least one layer in the golf ball is formed from a composition including a multi-modal ionomer formed from a first copolymer having a molecular weight of about 70,000 or greater and a second copolymer having a molecular weight of about 40,000 or less, wherein the multi-modal ionomer has a flexural modulus of about 27,000 psi to about 90,000 psi after 2 weeks. In one embodiment, the first copolymer has a molecular weight of about 80,000 to about 200,000. In another embodiment, the second copolymer has a molecular weight of about 2,000 to about 30,000.

The composition may further include a neutralizing agent. In addition, the composition may further include a thermoplastic polymer selected from the group consisting of ionomers, acid copolymers, highly neutralized polymers, and mixtures thereof.

In one embodiment, the golf ball includes an intermediate layer disposed between the core and the cover, wherein the intermediate layer is formed from the multi-modal ionomer. In another embodiment, the cover is formed from the multi-modal ionomer.

The present invention is also directed to a golf ball including a core having a diameter of about 1.50 inches to about 1.60 inches and a cover having a thickness of about 0.03 to about 0.07 inches, wherein at least one layer of the golf ball is formed from a composition including an in-situ neutralized multi-modal polymer comprising a first acid copolymer having a molecular weight of about 70,000 or greater, a second acid copolymer having a molecular weight of about 40,000 or less, and a neutralizing agent. The neutralizing agent may include barium salts, lithium salts, sodium salts, zinc salts, copper salts, potassium salts, magnesium salts, cesium salts, aluminum salts, tin salts, calcium salts, and mixtures thereof. In addition, the composition may further include a processing aid such as fatty acids, fatty acid salts, and mixtures thereof. In one embodiment, the golf ball includes an intermediate layer disposed between the core and the cover, wherein the intermediate layer has a hardness of about 60 to about 75 Shore D.

The present invention also relates to a method of forming a golf ball, including the steps of: providing a golf ball core; forming an in-situ multi-modal mixture by providing a first acid copolymer having a molecular weight of about 70,000 or greater, providing a second acid copolymer having a molecular weight of about 40,000 or less, providing a neutralizing agent; mixing the first acid copolymer, the second acid copolymer, and the V) neutralizing agent to form the in-situ multi-modal mixture; and forming a cover disposed about the core with the in-situ multi-modal mixture.

In an alternate embodiment, the present invention is directed to a method of forming a golf ball, including the steps of: providing a golf ball core; forming a multi-modal mixture by polymerizing in-situ a first acid copolymer having a molecular weight of about 70,000 or greater in the presence of a second acid copolymer having a molecular weight of about 40,000 or less to form an in-situ polymer mixture, providing a neutralizing agent, processing the in-situ polymer mixture with the neutralizing agent to form the multi-modal mixture; and forming a cover disposed about the core with the multi-modal mixture.

The cover may include an inner cover and an outer cover. In one embodiment, the inner cover is formed from the in-situ multi-modal mixture. In another embodiment, the outer cover includes the in-situ multi-modal mixture. In addition, the multi-modal mixture may have a flexural modulus of about 27,000 psi to about 90,000 psi after 2 weeks. In an alternate embodiment, the multi-modal mixture has a flexural modulus of about 5,000 psi to about 25,000 psi after 2 weeks.

The method may further include the step of providing a processing aid, wherein the step of mixing further includes mixing the processing aid with the first acid copolymer, the second acid copolymer, and the neutralizing agent to form the in-situ multi-modal mixture. In addition, a blend may be formed from the multi-modal mixture and a thermoplastic polymer selected from the group consisting of ionomers, acid copolymers, highly neutralized polymers, and mixtures thereof.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
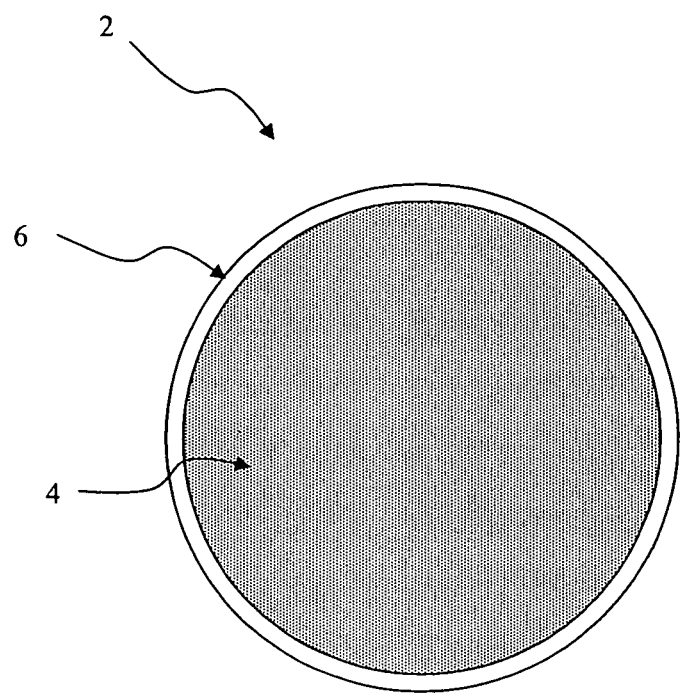
FIG. 1 is a cross-sectional view of a two-piece golf ball, wherein the cover is formed from a composition of the invention.

The present invention relates to compositions including multi-modal ionomers and blends of multi-modal ionomers with conventional ionomers, highly or fully neutralized polymers, acid copolymers, and other suitable polymers. In particular, the compositions of the invention provide a soft, resilient alternative to materials that have processing and delamination issues. In addition, the present invention explores the methods of making such compositions and the golf balls that are formed using the compositions.

The compositions of the invention, can be used with a variety of golf ball constructions. For example, the compositions of the invention may be used as a cover layer in a two-piece ball with a large core, an outer cover layer in a three-piece ball with a relatively thin inner cover layer, an intermediate layer in a three-piece ball, or an inner cover layer in a golf ball having dual cover layers. The composition components, golf ball constructions, and layer and ball properties are discussed in greater detail below.

The Compositions of the Invention

The compositions of the invention include a multi-modal ionomer. In particular, the compositions of the invention include bi-model ionomers for increased stiffness. A variety of polymers may be blended with the multi-modal ionomers to form suitable inner and outer cover layer compositions. These polymers, which are discussed in more detail below, include, but are not limited to, conventional ionomers including low and high acid ionomers, highly or fully neutralized polymers, acid copolymers, and mixtures thereof. These polymers are discussed in greater detail below.

Multi-Modal Ionomers

Multi-modal ionomers are blends of copolymers having sufficiently different molecular weights such that different peaks are observed when the blend molecular weight distribution is measured. In one embodiment, the multi-modal blend includes at least two copolymers with differing molecular weights. For example, a suitable multi-modal ionomer blend according to the invention includes at least one high molecular weight copolymer having a molecular weight of about 70,000 or greater and at least one low molecular weight copolymer having a molecular weight of about 40,000 or less. In another embodiment, the multi-modal blend includes at least three copolymers with differing molecular weights. In yet another embodiment, at least four copolymers with differing molecular weights are used to form the multi-modal ionomer blend.

The high and low molecular weight copolymers include acidic groups, such as carboxylate or sulfonate, the acidic groups being at least partially neutralized with a base. In an alternate embodiment, the high and low molecular weight copolymers include basic groups, such as primary, secondary, and tertiary nitrogen, the basic groups being at least partially quaternized with an acid, organic alkyl halide, or organic aryl halide.

Those of ordinary skill in the art are aware of the methods to make high and low molecular weight copolymers for use in the multi-modal ionomer blends of the present invention. In particular, U.S. Pat. No. 3,262,272, which is incorporated in its entirety by reference herein, outlines a general method to obtain the copolymers. For example, copolymerization of an acidic or basic monomer, such as alkyl (meth)acrylate, with at least one other comonomer, such as an olefin, styrene or vinyl acetate, produces an copolymer suitable for use with the present invention. Alternatively, acidic or basic groups may be incorporated into a polymer to form a copolymer by reacting the polymer, such as polystyrene or a polystyrene copolymer including a block copolymer of polystyrene, with a functionality reagent, such as a carboxylic acid or sulfonic acid.

Unlike conventional ionomers, the negatively charged acidic groups, e.g., carboxylate or sulfonate, may be neutralized after in-situ polymerization or extrusion of the high and low molecular weight copolymers by reactive processing with a cation. Alternatively, the high and low molecular weight copolymers may be neutralized separately, before mixing. Suitable cations include, but are not limited to, lithium, sodium, potassium, magnesium, calcium, barium, lead, tin, zinc, or aluminum, or a combination of such cations. In addition, any basic groups, e.g., primary, secondary, and tertiary nitrogen, may be quaternized after in-situ polymerization or extrusion of the high and low molecular weight copolymers by reactive processing with an anion. Nonlimiting examples of suitable anions include halides, organic acids, organic alkyl and aryl halides, and mixtures thereof. The different methods for processing the multi-modal ionomer blends will be discussed in greater detail below.

Examples of suitable copolymers are also disclosed in U.S. Pat. No. 5,885,172, which is incorporated in its entirety by reference herein. These copolymers are obtained by providing a cross metallic bond to polymers of monoolefin with at least one member selected from the group consisting of unsaturated mono- or di-carboxylic acids having 3 to 12 carbon atoms and esters thereof (the polymer contains about I percent to about 50 percent by weight of the unsaturated mono- or di-carboxylic acid and/or ester thereof). More particularly, this acid-containing copolymer includes E/X/Y copolymers where E is ethylene, X is a softening comonomer, such as acrylate or methacrylate, present in 0 percent to about 50 percent by weight of the polymer (preferably 0 weight percent to about 25 weight percent, most preferably 0 weight percent to about 20 weight percent), and Y is acrylic or methacrylic acid present in about 5 to about 35 weight percent of the polymer, wherein the acid moiety is neutralized about 1 percent to about 100 percent (preferably at least about 40 percent, most preferably at least about 60 percent) to form an ionomer by a cation as detailed above.

The copolymers for use in the multi-modal ionomer blends may also include "low acid" and "high acid" copolymers. In general, ionic copolymers including up to about 16 percent acid are considered "low acid" ionomers, while those including greater than about 16 percent acid are considered "high acid" ionomers by the present inventors. A high acid copolymer may be a copolymer of an olefin, e.g., ethylene, and greater than about 16 weight percent of an α,β-ethylenically unsaturated carboxylic acid, e.g., acrylic or methacrylic acid, wherein about 10 percent to about 100 percent of the carboxylic acid groups are neutralized with a metal ion, e.g., zinc, sodium, magnesium or lithium, either prior to mixing or after in-situ polymerization or extrusion with at least one other copolymer. In one embodiment, the high acid copolymer is a copolymer of ethylene and about 17 weight percent to about 20 weight percent methacrylic acid. Alternatively, a low acid copolymer may be a copolymer of an olefin and about 16 percent or less of an α,β-ethylenically unsaturated carboxylic acid having at least a portion of the acid groups neutralized either before mixing or after in-situ polymerization or extrusion.

For example, the multi-modal ionomer blend includes a low acid copolymer having about 16 percent or less of the acid groups neutralized. In addition, the high acid copolymer in the multi-modal ionomer blend has at least about 17 percent of the acid groups neutralized, and more preferably about 25 percent. In one embodiment, the high acid copolymer is neutralized to about 30 percent to about 100 percent, preferably about 50 percent to about 100 percent. In another embodiment, about 70 percent to about 100 percent of the acid groups in the high acid copolymers are neutralized, and more preferably about 80 percent to about 100 percent. When the copolymer is highly or fully neutralized, e.g., about 70 percent or more of the acid groups neutralized, organic acids and salts thereof to improve achieve processability. As discussed with respect to the highly neutralized polymer section below, these organic acids include, but are not limited to, oxa acids and salts thereof, fatty acid salts, and combinations thereof.

In one embodiment, the high and low molecular weight copolymers are based on acid-containing ethylene copolymers. Suitable acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

Commercially available copolymers suitable for use with the present invention include SURLYNs® from DuPont and Ioteks® from Exxon. For example, SURLYN® 8940 (Na), SURLYN® 9650 (Zn), and SURLYN® 9910 (Zn) are examples of low acid ionomer resins with the acid groups that have been neutralized to a certain degree with a cation. More examples of suitable low acid ionomers, e.g., Escor® 4000/7030 and Escor® 900/8000, are disclosed in U.S. Pat. Nos. 4,911,451 and 4,884,814, the disclosures of which are incorporated by reference herein. High acid ionomer resins include SURLYN(® 8140 (Na) and SURLYN® 8546 (Li), which have an methacrylic acid content of about 19 percent. The acid groups of these high acid ionomer resins that have been neutralized to a certain degree with the designated cation.

As mentioned generally above, the high molecular weight copolymer has a molecular weight of about 70,000 or greater and the low molecular weight copolymer has a molecular weight of about 40,000 or less. In one embodiment, the high molecular weight copolymer has a molecular weight of about 70,000 to about 500,000, preferably about 75,000 to about 400,000, and more preferably from about 80,000 to about 250,000. For example, the high molecular weight copolymer may have a molecular weight of about 80,000 to about 200,000.

Alternatively, the low molecular weight copolymer may have a molecular weight of about 1,000 to about 40,000, preferably about 1,500 to about 35,000, and more preferably about 2,000 to about 30,000. In one embodiment, the low molecular weight copolymer has a molecular weight of about 2,500 to about 27,000.

Because the molecular weight distribution is integral to the multi-modal ionomer blend, when a high molecular weight polymer has a molecular weight at the lower end of the spectrum, a low molecular weight polymer having a relatively high molecular weight is preferably used in order to achieve the proper distribution. For example, a suitable low molecular weight polymer for use with a high molecular weight polymer having a molecular weight of about 70,000 to about 100,000 is one having a molecular weight of about 40,000 or less. In one embodiment, the molecular weight of the low molecular weight polymer is 1,000 to about 7,000. In the case of multiple copolymers in the multi-modal ionomer blend, e.g., at least three, the molecular weight of each copolymer should differ from the others by at least 5,000. In one embodiment, a molecular weight of each copolymer differs from the other copolymers in the blend by at least about 7,000. In still another embodiment, a molecular weight of each copolymer differs from the other copolymers in the blend by at least about 10,000.

The different molecular weights of the polymers in the multi-modal blend can also be expressed as a ratio between the two or more polymers. For example, in one embodiment, the ratio of the molecular weight between the high molecular weight polymer and the low molecular weight polymer is at least 1.75, preferably about 2.5 or greater. In one embodiment, the ratio is about 100 or less. In another embodiment, the ratio of the molecular weight of the high molecular weight polymer to the low molecular weight polymer is about 1.75 to about 70. In still another embodiment, the ratio ranges from about 10 to about 14.

The multi-modal ionomers may be formed in a variety of ways. For example, a multi-modal ionomeric blend may be formed by in-situ polymerization of at least one high molecular weight copolymer in the presence of at least one previously formed low molecular weight copolymer, which is followed by reactive processing with a suitable cation or anion (depending on the type of copolymer) to neutralize the acid or basic groups. Those of ordinary skill in the art understand that in-situ polymerization refers to forming a polymeric material in the presence of a previously formed polymeric material and that the reactive processing with the cation or anion occurs in the same reactor. In addition, the reactive processing may further include an organic acid and/or an organic acid salt as discussed in more detail below. In another embodiment, at least three copolymers having differing molecular weights are subjected to in-situ polymerization followed by reactive processing with a suitable cation or anion.

Another suitable method of forming the multi-modal ionomeric blends of the present invention includes mixing at least one high molecular weight copolymer with at least one low molecular weight copolymer in an extruder, e.g., a single or twin-screw extruder, or other suitable polymer mixing equipment. Once the multi-modal ionomer blend has been formed, a suitable neutralizing agent, e.g., a cation or anion, is added. Similar to the method discussed above, an organic acid and/or an organic acid salt may also be incorporated at this time. In another embodiment, at least three copolymers having differing molecular weights are first mixed and then a suitable neutralizing agent is added.

A third method of forming the multi-modal ionomeric compositions of the invention includes mixing at least one high molecular weight copolymer and at least one low molecular weight copolymer that have each been separately neutralized prior to mixing with a suitable neutralizing agent, e.g., a cation or anion, by hand-mixing or passing through. For example, the mixing may be performed with suitable polymer mixing equipment, such as a single or twin-screw extruder. The resultant multi-modal ionomer blend may be further neutralized using a neutralizing agent, such as a cation or anion, to achieve a higher degree of neutralization. One of ordinary skill in the art will appreciate that any number of copolymers with differing molecular weights can be separately neutralized prior to mixing in order to form the multi-modal blend of the invention. For example, this method may be used with at least three copolymers of differing molecular weights.

As discussed generally above, the multi-modal ionomer blends may include an organic acid, or a salt thereof, may be included in the compositions of the invention to aid in adjusting the melt viscosity of the blend as appropriate, as well as to minimize the loss of resilience and maximize the coefficient of restitution. The organic acid (salt) may be included during reactive processing or after extrusion, depending on the method employed to form the multi-modal ionomer blend.

The organic acid (or salt thereof) is preferably selected such that the molecular weight is much less than the base resin, e.g., about 250 or greater, about 1500 or less, or somewhere in between. The small molecular weight of the organic acid or salt thereof allows proper adjustment of the melt viscosity of the mixture and a contribution to fluidity.

Suitable organic acids include, but are not limited to, aliphatic, mono-functional (saturated, unsaturated, or multi-unsaturated) organic acids. For example, unsaturated and saturated fatty acids (and derivatives thereof) are contemplated for use with the present invention. In particular, the unsaturated fatty acid has a double or triple bond in the alkyl group, whereas a saturated fatty acid contains only single bonds in the alkyl group. Specific examples of the fatty acids include stearic acid, 12-hydroxystearic acid, behenic acid, oleic acid, linolenic acid, erucic acid, arachidic acid and lignoceric acid.

Salts of these organic acids, which may be formed by replacing one or more of the hydrogen atoms of the acid with an anion or cation, are also contemplated for use with the present invention. In particular, suitable salts include barium salts; lithium salts; sodium salts; zinc salts; bismuth salts; chromium salts; cobalt salts; copper salts; potassium salts; strontium salts; titanium salts, such as 2-ethylhexyl titanate; tungsten salts; magnesium salts; cesium salts; iron salts; nickel salts; silver salts; aluminum salts; tin salts; calcium salts; fatty acid salts, such as stearic salts, behenic salts, erucic salts, oleic salts, linoelic salts; and mixtures thereof. Specific examples of fatty acid salts include, but are not limited to, magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate.

The organic acid or organic acid salt may be present in an amount of about 5 percent to about 80 percent by weight of the composition. In one embodiment, the organic acid or organic acid salt is present in an amount of about 10 percent to about 50 percent by weight of the composition. In another embodiment, the composition includes about 15 percent to about 25 percent by weight of the organic acid or organic acid salt.

The multi-modal ionomer blends preferably have a flexural modulus of about 4,000 psi to about 20,000 psi after 40 hours. By adjusting the neutralization level, the flexural modulus of the multi-modal ionomer blend can shift drastically. For example, when the neutralization is adjusted, the resulting flexural modulus can range from about 25,000 to about 85,000 psi after 40 hours. In addition, the flexural modulus of the multi-modal ionomer blend after 2 weeks is from about 5,000 psi to about 25,000 psi. In the alternative, the flexural modulus after 2 weeks can range from about 27,000 psi to about 90,000 psi when the neutralization level is adjusted.

Forming Blends Including the Multi-Modal Ionomers of the Invention

Once the multi-modal ionomer blend is formed, the blend may be mixed with acid copolymers, conventional ionomers, highly neutralized polymers (HNPs), and other suitable polymers with polymer mixing equipment. Because the multi-modal ionomer backbone is compatible with acid copolymers, conventional ionomers, HNPs, and the like, the processing problems and delamination issues experienced with blends of these polymers and metallocene-catalyzed polymers, such as FUSABOND®, are overcome.

The compositions of the invention preferably include about 1 percent to about 100 percent of the multi-modal ionomer blend. In one embodiment, the compositions contain about 10 percent to about 90 percent of the multi-modal ionomer blend, preferably from about 10 percent to about 75 percent of the multi-modal ionomer blend, and about 90 percent to 10 percent, more preferably from about 90 percent to about 25 percent of the other polymers and/or other materials as described below. For example, a golf ball of the invention may include a cover from the composition of the invention having about 10 percent to about 40 percent of the multi-modal ionomer blend and about 60 percent to about 90 percent of another thermoplastic polymer, e.g., a conventional ionomer. In an alternate embodiment, a composition of the invention may include about 40 percent to about 80 percent of the multi-modal ionomer blend and about 20 percent to about 60 percent of another thermoplastic polymer. And, in yet another embodiment, a golf ball layer is formed from a composition of the invention that includes 100 percent of the, multi-modal ionomer blend.

Unless otherwise stated herein, all percentages are given in percent by weight of the total composition of the golf ball layer in question.

Acid Copolymers

The multi-modal ionomer blend may be blended with acid copolymers. Suitable acid-containing olefin copolymers include, but are not limited to, acid-containing ethylene copolymers, acid-containing propylene copolymers, acid-containing butylene copolymers, and the like.

Non-limiting examples of acid-containing ethylene copolymers ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate.

Conventional Ionomers

The compositions of the invention may include a blend of the multi-modal ionomers and at least one conventional ionomer. As used herein, the term "conventional ionomer" is intended to encompass those polymers obtained by copolymerization of an acidic or basic monomer, such as alkyl (meth)acrylate, with at least one other comonomer, such as an olefin, styrene or vinyl acetate, followed by at least partial neutralization. Alternatively, acidic or basic groups may be incorporated into a polymer to form an ionomer by reacting the polymer, such as polystyrene or a polystyrene copolymer including a block copolymer of polystyrene, with a functionality reagent, such as a carboxylic acid or sulfonic acid, followed by at least partial neutralization. Suitable neutralizing sources include cations for negatively charged acidic groups and anions for positively charged basic groups.

For example, conventional ionomers may be obtained by providing a cross metallic bond to polymers of monoolefin with at least one member selected from the group consisting of unsaturated mono- or di-carboxylic acids having 3 to 12 carbon atoms and esters thereof (the polymer contains about 1 percent to about 50 percent by weight of the unsaturated mono- or di-carboxylic acid and/or ester thereof). In one embodiment, the ionomer is an E/X/Y copolymers where E is ethylene, X is a softening comonomer, such as acrylate or methacrylate, present in 0 percent to about 50 percent by weight of the polymer (preferably 0 weight percent to about 25 weight percent, most preferably 0 weight percent to about 20 weight percent), and Y is acrylic or methacrylic acid present in about 5 to about 35 weight percent of the polymer, wherein the acid moiety is neutralized about 1 percent to about 100 percent (preferably at least about 40 percent, most preferably at least about 60 percent) to form an ionomer by a cation such as lithium, sodium, potassium, magnesium, calcium, barium, lead, tin, zinc, or aluminum, or a combination of such cations.

Any of the acid-containing ethylene copolymers discussed above may be used to form a conventional ionomer according to the present invention. In addition, the ionomer may be a low acid or high acid ionomer. As detailed above, a high acid ionomer may be a copolymer of an olefin, e.g., ethylene, and at least 16 weight percent of an $\alpha,\beta$-ethylenically unsaturated carboxylic acid, e.g., acrylic or methacrylic acid, wherein about 10 percent to about 100 percent of the carboxylic acid groups are neutralized with a metal ion. In contrast, a low acid ionomer contains about 15 weight percent of the $\alpha,\beta$-ethylenically unsaturated carboxylic acid.

Suitable commercially available ionomer resins include SURLYNs® (DuPont) and Ioteks® (Exxon). Other suitable ionomers for use in the blends of the present invention include polyolefins, polyesters, polystyrenes, SBS, SEBS, and polyurethanes, in the form of homopolymers, copolymers, or block copolymer ionomers.

Highly Neutralized Polymers

The multi-modal ionomeric compositions of the invention may also be blended with highly neutralized polymers (HNP). As used herein, a highly neutralized polymer has greater than about 70 percent of the acid groups neutralized. In one embodiment, about 80 percent or greater of the acid groups are neutralized. In another embodiment, about 90 percent or greater of the acid groups are neutralized. In still another embodiment, the HNP is a fully neutralized polymers, i.e., all of the acid groups (100 percent) in the polymer composition are neutralized.

Suitable HNPs for inclusion in a blend include, but are not limited to, polymers containing $\alpha,\beta$-unsaturated carboxylic acid groups, or the salts thereof, that have been highly neutralized by organic fatty acids. Such HNPs are commercially available from DuPont under the trade name HPF, e.g., HPF 1000 and HPF 2000. The HNP can also be formed using an oxa-containing compound as a reactive processing aid to avoid processing problems, as disclosed in U.S. Patent Publication No. 2003/0225197. In particular, an HNP can include a thermoplastic resin component having an acid or ionic group, i.e., an acid polymer or partially neutralized polymer, combined with an oxa acid, an oxa salt, an oxa ester, or combination thereof and an inorganic metal compound or organic amine compound. As used herein, a partially neutralized polymer should be understood to mean polymers with about 10 to about 70 percent of the acid groups neutralized. For example, the HNP can includes about 10 percent to about 30 percent by weight of at least one oxa acid, about 70 percent to about 90 percent by weight of at least one thermoplastic resin component, and about 2 percent to about 6 percent by weight of an inorganic metal compound, organic amine, or a combination thereof.

In addition, the HNP can be formed from an acid copolymer that is neutralized by one or more amine-based or an ammonium-based components, or mixtures thereof, as disclosed in co-pending U.S. patent application Ser. No. 10/875725, filed Jun. 25, 2004, entitled "Golf Ball Compositions Neutralized with Ammonium-Based and Amine-Based Compounds," which is incorporated in its entirety by reference herein.

Furthermore, those of ordinary skill in the art will appreciate that the HNPs may be neutralized using one or more of the above methods. For example, an acid copolymer that is partially or highly neutralized in a manner described above may be subjected to additional neutralization using more traditional processes, e.g., neutralization with salts of organic fatty acids and/or a suitable cation source.

Other Polymers

Other polymeric materials suitable for blending with the multi-modal ionomer blends include castable thermoplastics, cationic and anionic urethane ionomers and urethane epoxies, polyurethane ionomers, polyurea ionomers, epoxy resins, polyethylenes, polyamides and polyesters, polycarbonates, polyacrylin, siloxanes and epoxy resins or their blends, and mixtures thereof. One of ordinary skill in the art would be well aware of methods to blend the polymeric materials with the multi-modal ionomer blends to form a composition in accordance with the present invention.

Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870. In particular, the polyureas of U.S. Pat. No. 5,484,870 are prepared by reacting a polyisocyanate and a polyamine curing agent to yield polyurea, which are distinct from the polyureas of the present invention which are formed from a polyurea prepolymer and curing agent. Examples of suitable polyurethanes cured with epoxy group containing curing agents are disclosed in U.S. Pat. No. 5,908,358. The disclosures of the above patents are incorporated herein by reference in their entirety.

Additives

The compositions of the invention may include a variety of additives. For example, the compositions of the invention may be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Blowing or foaming agents useful include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Furthermore, the use of liquid nitrogen for foaming, as disclosed in U.S. Pat. No. 6,386,992, which is incorporated by reference herein, may produce highly uniform foamed compositions for use in the present invention.

Fillers may also be added to the compositions of the invention to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. Generally, the filler will be inorganic, having a density of greater than 4 g/cc, and will be present in amounts between about 5 and about 65 weight percent based on the total weight of the polymer components included in the layer(s) in question. Examples of useful fillers include zinc oxide, barium sulfate, calcium oxide, calcium carbonate, and silica, as well as other known corresponding salts and oxides thereof.

Fillers may also be used to modify the weight of the core or at least one additional layer for specialty balls, e.g., a lower weight ball is preferred for a player having a low swing speed.

Additional materials conventionally included in other golf ball compositions may also be included in the compositions of the invention. For example, antioxidants, stabilizers, softening agents, plasticizers, including internal and external plasticizers, reinforcing materials, and compatibilizers may also be added to any composition of the invention. Those of ordinary skill in the art are aware of the purpose of these additives and the amounts that should be employed to fulfill those purposes.

Composition Properties

The compositions of the invention preferably provide a certain degree of stiffness while maintaining a soft feel. Thus, the compositions of the invention preferably have a flexural modulus, as measured per ASTM D6272-02, of about 10,000 psi to about 80,000 psi at 40 hours. In one embodiment, the flexural modulus of the compositions of the invention is about 15,000 psi to about 70,000 psi at 40 hours. In another embodiment, the compositions have a flexural modulus of about 17,000 psi to about 55,000 psi at 40 hours.

As known to those of ordinary skill in the art, depending on the material, the flexural modulus values typically increases over time. As such, the flexural modulus of the compositions of the invention is about 15,000 psi to about 60,000 psi at 2 weeks. In another embodiment, the flexural modulus of the compositions of the invention is about 16,000 psi to about 50,000 psi at 2 weeks, preferably about 17,000 psi to about 40,000 psi at 2 weeks. For example, the compositions of the invention may have a flexural modulus of about 18,000 psi to about 37,000 psi after 2 weeks.

For example, when the compositions of the invention include about 10 percent to about 40 percent of the multi-modal ionomer by weight of the composition, the flexural modulus is preferably about 30,000 psi to about 60,000 psi at 40 hours, preferably about 32,000 psi to about 54,000 psi at 40 hours and about 35,000 psi to about 65,000 psi at 2 weeks, preferably about 37,000 psi to about 62,000 psi at 2 weeks. And, when the composition includes about 40 percent to about 80 percent of the multi-modal ionomer blend by weight of the composition, the flexural modulus is generally lower, e.g., about 15,000 psi to about 40,000 psi at 40 hours and about 17,000 to about 30,000 psi at 2 weeks, preferably about 17,000 psi to about 34,000 psi at 40 hours and about 18,000 psi to about 37,000 psi at 2 weeks.

Golf Ball Construction

As discussed briefly above, the compositions of the present invention may be used with any type of ball construction including, but not limited to, one-piece, two-piece, three-piece, and four-piece designs, a double core, a double cover, an intermediate layer(s), a multilayer core, and/or a multi-layer cover depending on the type of performance desired of the ball. That is, the compositions of the invention may be used in a core, an intermediate layer, and/or a cover of a golf ball, each of which may have a single layer or multiple layers.

As used herein, the term "multilayer" means at least two layers. For instance, the core may be a one-piece core or a multilayer core, i.e., a core that has an innermost component with an additional core layer or additional core layers disposed thereon. As used herein, the terms "core" and "center" are generally used interchangeably to reference the innermost component of the ball. In some embodiments, however, the term "center" is used when there are multiple core layers, i.e., a center and an outer core layer.

When the golf ball of the present invention includes an intermediate layer, which may also include more than one layer, this layer may be incorporated with a single or multi-layer cover, a single or multi-piece core, with both a single layer cover and core, or with both a multilayer cover and a multilayer core. The intermediate layer may be also be referred to as an inner cover layer or outer core layer, or any other layer(s) disposed between the inner core and the outer cover of a golf ball.

Referring to FIG. 1, a golf ball 2 of the present invention can include a center 4 and a cover 6 surrounding the center 4. While dimensions and materials are discussed in more detail below, a golf ball of the invention can include a large core, e.g., about 1.55 inches to about 1.60 inches, and a relatively soft, thin cover formed from the composition of the invention.

Figure 2:
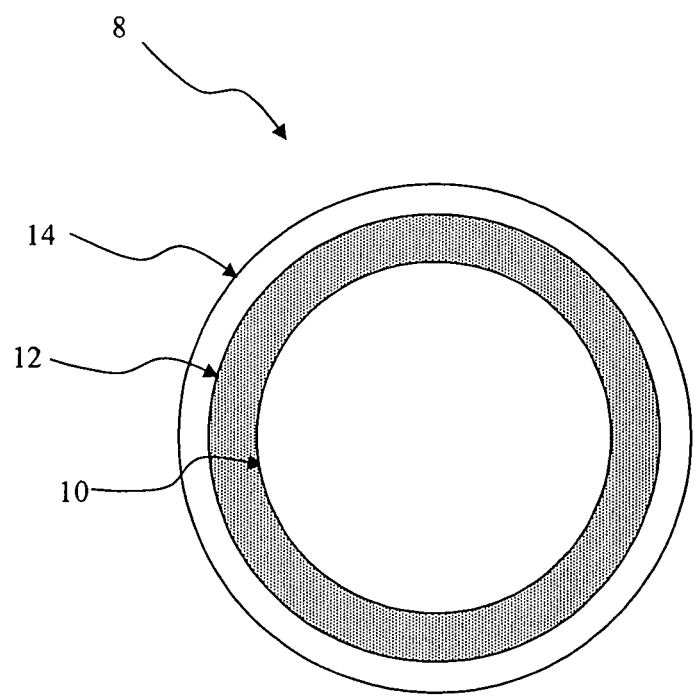
FIG. 2 is a cross-sectional view of a multi-component golf ball, wherein at least one layer is formed from a composition of the invention.
Figure 3:
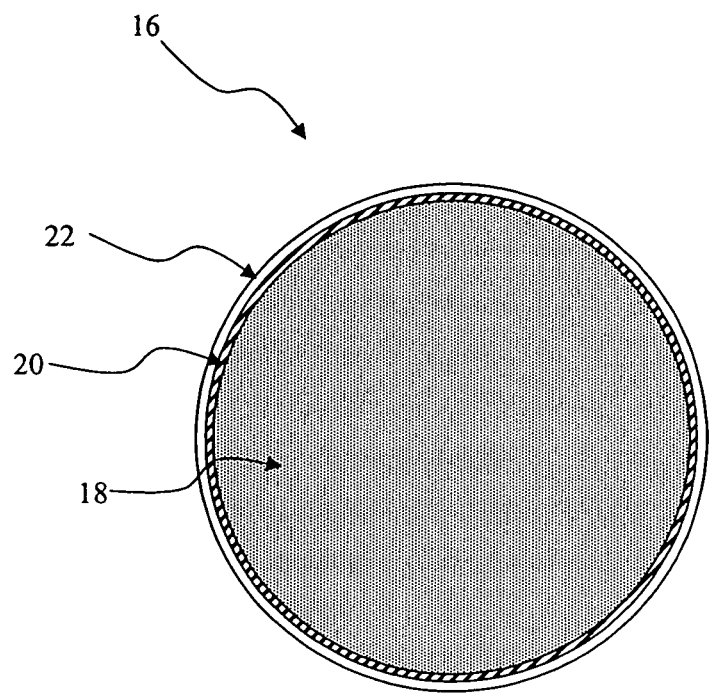
FIG. 3 is a cross-sectional view of a multi-component golf ball having a large core, wherein at least one layer is formed from a composition of the invention.

Referring to FIG. 2, a golf ball 8 of the present invention can include a center 10, a cover 14, and at least one intermediate layer 12 disposed between the cover and the center. Each of the cover and center layers in FIGS. 1 or 2 may include more than one layer, i.e., the golf ball can be a conventional three-piece wound ball, a two-piece ball, a ball having a multi-layer core and an intermediate layer or layers, etc. Also, FIG. 3 shows a golf ball 16 of the present invention including a large core 18, a cover 22, and an inner cover layer 20. In one embodiment, the core 18 includes a center and an outer core layer.

Figure 4:
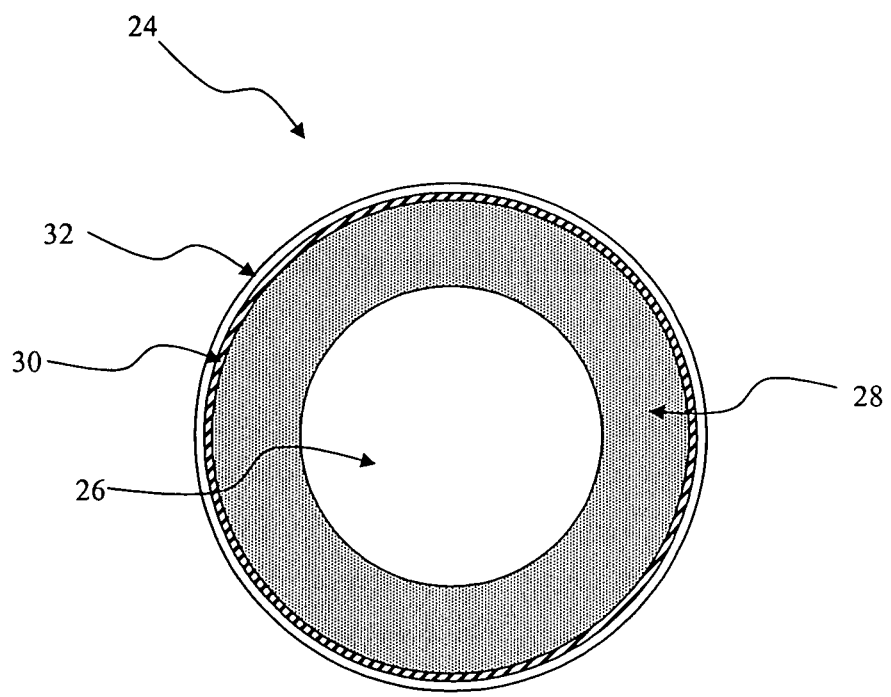
FIG. 4 is a cross-sectional view of a multi-component golf ball including a dual core and a dual cover, wherein at least one layer is formed from a composition of the invention.

In another embodiment, as shown in FIG. 4, a golf ball 24 of the present invention can include a large core having a center 26 and an intermediate layer 28 disposed underneath a dual cover having an inner cover layer 30 and an outer cover layer 32. Further, any of the figures detailed herein may include embodiments wherein an optional wound layer is disposed between the center and the core of the golf ball.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Golf Ball Core Layer(s)

The cores of the golf balls formed according to the invention may be solid, semi-solid, hollow, fluid-filled or powder-filled, one-piece or multi-component cores. As used herein, the term "fluid" includes a liquid, a paste, a gel, a gas, or any combination thereof; the term "fluid-filled" includes hollow centers or cores; and the term "semi-solid" refers to a paste, a gel, or the like.

Any core material known to one of ordinary skill in that art is suitable for use in the golf balls of the invention. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. For example, butadiene rubber, which, in an uncured state, typically has a Mooney viscosity (measured according to ASTM D1646-99) greater than about 20, preferably greater than about 30, and more preferably greater than about 40, may be used in one or more core layers of the golf balls prepared according to the present invention. In addition, the compositions of the invention may be incorporated the core.

A free-radical source, often alternatively referred to as a free-radical initiator, may optionally be used in the core, or one or more layers of the golf balls according to the invention, particularly when a polymer component includes a thermoset material. The free radical source for is preferably a peroxide, more preferably an organic peroxide. The peroxide is typically present in an amount greater than about 0. I parts per hundred of the total polymer component, preferably about 0.1 to 15 parts per hundred of the polymer component, and more preferably about 0.2 to 5 parts per hundred of the total polymer component. It should be understood by those of ordinary skill in the art that the presence of certain components may require a larger amount of free-radical source than the amounts described herein. The free radical source may alternatively or additionally be one or more of an electron beam, UV or gamma radiation, x-rays, or any other high energy radiation source capable of generating free radicals. It should be further understood that heat often facilitates initiation of the generation of free radicals when peroxides are used as a free-radical initiator.

Golf Ball Intermediate Layer(s)

When the golf ball of the present invention includes an intermediate layer, such as an inner cover layer or outer core layer, i.e., any layer(s) disposed between the inner core and the outer cover of a golf ball, this layer can include any materials known to those of ordinary skill in the art including thermoplastic and thermosetting materials. In one embodiment, the intermediate layer is formed, at least in part, from the composition of the invention.

The intermediate layer(s) may also be formed, at least in part, from one or more homopolymeric or copolymeric materials, such as ionomers, primarily or fully non-ionomeric thermoplastic materials, vinyl resins, polyolefins, polyurethanes, polyureas, such as those disclosed in U.S. Pat. No. 5,484,870, polyamides, acrylic resins and blends thereof, olefinic thermoplastic rubbers, block copolymers of styrene and butadiene, isoprene or ethylene-butylene rubber, copoly (ether-amide), such as PEBAX, sold by Atofina Chemicals, Inc. of Philadelphia, Pa., polyphenylene oxide resins or blends thereof, and thermoplastic polyesters.

For example, the intermediate layer may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate layer may also be formed from the compositions as disclosed in U.S. Pat. No. 5,688,191. The entire disclosures of these patents and publications are incorporated herein by express reference thereto.

In one embodiment, the intermediate layer may be a moisture barrier layer as disclosed in U.S. Pat. No. 6,632,147. Thus, a golf ball of the invention may include an intermediate layer that has a moisture vapor transmission rate lower that that of the cover and, additionally, a primary ingredient of the intermediate layer is made from a material including polybutadiene, natural rubber, butyl-based rubber, acrylics, trans-polyisoprene, neoprene, chlorinated polyethylene, balata, multi-layer thermoplastic films, blends of ionomers, polyvinyl alcohol copolymer and polyamides, and dispersions of acid salts of polyetheramines. In another embodiment, golf balls of the invention include an intermediate layer or inner cover layer formed from the compositions of the invention and an additional moisture barrier layer.

The intermediate layer may also include a wound layer formed from a tensioned thread material. The thread may be single-ply or may include two or more plies. Suitable thread materials include, but are not limited to, fiber, glass, carbon, polyether urea, polyether block copolymers, polyester urea, polyester block copolymers, syndiotactic- or isotactic-poly (propylene), polyethylene, polyamide, poly(oxymethylene), polyketone, poly(ethylene terephthalate), poly(p-phenylene terephthalamide), poly(acrylonitrile), diaminodicyclohexylmethane, dodecanedicarboxylic acid, natural rubber, polyisoprene rubber, styrene-butadiene copolymers, styrene-propylene-diene copolymers, another synthetic rubber, or block, graft, random, alternating, brush, multi-arm star, branched, or dendritic copolymers, or mixtures thereof. Those of ordinary skill in the art are aware of the process for producing thread materials for use with the present invention.

Golf Ball Cover Layer(s)

The cover provides the interface between the ball and a club. Properties that are desirable for the cover are good moldability, high abrasion resistance, high impact resistance, high tear strength, high resilience, and good mold release, among others. The cover layer may be formed, at least in part, from a composition of the invention. For example, the present invention contemplates a golf ball having a large core of polybutadiene and a thin cover formed from the composition of the invention.

When the compositions of the invention are incorporated into a core or intermediate/inner cover layer, however, the cover may be formed from one or more homopolymeric or copolymeric materials as discussed in the section above pertaining to the intermediate layer. The cover may also be at least partially formed from a polybutadiene reaction product, as discussed above with respect to the core.

Layer Formation

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, such as the compositions of the invention, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

The cores of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded. Furthermore, U.S. Pat. Nos. 6,180,040 and 6,180,722 disclose methods of preparing dual core golf balls. The disclosures of these patents are hereby incorporated by reference in their entirety.

The intermediate layer and/or cover layer may also be formed using any suitable method known to those of ordinary skill in the art. For example, an intermediate layer may be formed by blow molding and covered with a dimpled cover layer formed by injection molding, compression molding, casting, vacuum forming, powder coating, and the like. And, when a golf ball includes a cover layer formed from a composition of the invention, the multi-modal ionomer blend and at least one other polymer may be first mixed with polymer mixing equipment, such as a single or twin-screw extruder, and then injection molded onto an inner ball.

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Furthermore, the resultant golf balls prepared according to the invention typically will have dimple coverage greater than about 60 percent, preferably greater than about 65 percent, and more preferably greater than about 70 percent.

In one embodiment, a golf ball of the invention includes a large core, e.g., about 1.55 inches to about 1.60 inches, and a thin cover, e.g., about 0.02 inches to abut 0.05 inches, that has a 392-count icosahedron dual dimple design. In another embodiment, the golf ball includes a slightly smaller core, e.g., about 1.50 inches to about 1.57 inches, and a slightly thicker cover, e.g., about 0.04 inches to abut 0.07 inches, that has a 392-count icosahedron dimple design with 5 different types of dimples.

Golf Ball Post-Processing

The golf balls of the present invention may be painted, coated, or surface treated for further benefits. For example, golf balls may be coated with urethanes, urethane hybrids, ureas, urea hybrids, epoxies, polyesters, acrylics, or combinations thereof in order to obtain an extremely smooth, tack-free surface. If desired, more than one coating layer can be used. The coating layer(s) may be applied by any suitable method known to those of ordinary skill in the art. In one embodiment, the coating layer(s) is applied to the golf ball cover by an in-mold coating process, such as described in U.S. Pat. No. 5,849,168, which is incorporated in its entirety by reference herein.

Golf Ball Properties

The properties such as core diameter, intermediate layer and cover layer thickness, hardness, and compression have been found to effect play characteristics such as spin, initial velocity and feel of the present golf balls.

Component Dimensions

Dimensions of golf ball components, i.e., thickness and diameter, may vary depending on the desired properties. For the purposes of the invention, any layer thickness may be employed. For example, the present invention relates to golf balls of any size, although the golf ball preferably meets USGA standards of size and weight. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches (43 mm) to about 1.740 inches (44 mm) is most preferred, however diameters anywhere in the range of from 1.700 to about 1.950 inches can be used.

Preferably, the overall diameter of the core and all intermediate layers is about 80 percent to about 98 percent of the overall diameter of the finished ball. The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches. The cover typically has a thickness to provide sufficient strength, good performance characteristics, and durability. In one embodiment, the cover thickness is from about 0.02 inches to about 0.12 inches, preferably about 0.1 inches or less. In another embodiment, the cover thickness is about 0.05 inches or less, preferably from about 0.02 inches to about 0.05 inches, and more preferably about 0.02 inches and about 0.045 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In another embodiment, the intermediate layer thickness is about 0.05 inches or less, more preferably about 0.01 inches to about 0.045 inches.

Hardness

The golf ball layers containing the compositions of the invention preferably have a have a material hardness greater than about 50 Shore D. It should be understood, especially to one of ordinary skill in the art, that there is a fundamental difference between "material hardness" and "hardness, as measured directly on a golf ball." Material hardness is defined by the procedure set forth in ASTM-D2240-00 and generally involves measuring the hardness of a flat "slab" or "button" formed of the material of which the hardness is to be measured. Generally, ASTM-D2240-00 requires calibration of durometers, which have scale readings from 0 to 100. However, readings below 10 or above 90 are not considered reliable, as noted in ASTM-D2240-00, and accordingly, all the hardness values herein are within this range.

In one embodiment, the material hardness of composition of the invention is about 55 Shore D to about 80 Shore D. In another embodiment, the composition has a material hardness of about 60 Shore D to about 75 Shore D.

The cores included in golf balls of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater. For example, a golf ball of the invention may include an inner cover formed from a rosin-modified polymeric composition of the invention having a hardness of about 60 Shore D to about 75 Shore D.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 60 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

Compression

Compression values are dependent on the diameter of the component being measured. The Atti compression of the core, or portion of the core, of golf balls prepared according to the invention is preferably less than about 80, more preferably less than about 75. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to 100. In yet another embodiment, the compression of the golf balls of the invention is about 75 or greater and about 95 or less. For example, a preferred golf ball of the invention may have a compression from about 80 to about 95.

Coefficient of Restitution

The present invention contemplates golf balls having CORs from about 0.700 to about 0.850 at an inbound velocity of about 125 f/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

Alternatively, the maximum COR of the ball is one that does not cause the golf ball to exceed initial velocity requirements established by regulating entities such as the USGA. As used herein, the term "coefficient of restitution" (CoR) is calculated by dividing the rebound velocity of the golf ball by the incoming velocity when a golf ball is shot out of an air cannon. The COR testing is conducted over a range of incoming velocities and determined at an inbound velocity of 125 ft/s. Another measure of this resilience is the "loss tangent," or tan $\delta$, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity, and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked material should be less than about 50,000 N/m at $-50°$ C. Preferably, the dynamic stiffness should be between about 10,000 and 40,000 N/m at $-50°$ C., more preferably, the dynamic stiffness should be between about 20,000 and 30,000 N/m at $-50°$ C.

Spin Rate

A spin rate of a golf ball refers to the speed it spins on an axis while in flight, measured in revolutions per minute ("rpm"). Spin generates lift, and accordingly, spin rate directly influences how high the ball flies and how quickly it stops after landing. The golf balls disclosed herein can be tested to determine spin rate by initially establishing test conditions using suitable control golf balls and golf clubs. For example, a spin rate of a golf ball struck by a standard golf driver was obtained by using test conditions for a Titleist NXT Tour® golf ball that gives a ball speed of about 159 to about 161 miles/hour, a launch angle of about 9.0 degrees to about 10.0 degrees, and a spin rate of about 2900 rpm to about 3100 rpm. Thus, in one embodiment, the spin rate of a golf ball of the invention hit with a golf club driver under the same test conditions is between about 1200 rpm to about 4200 rpm. In a preferred embodiment, the spin rate of a golf ball hit with a golf club driver is between about 2000 rpm to about 4000 rpm, more preferably between about 2500 and 3900 rpm.

For an 8-iron ball spin test, a spin rate of a golf ball struck by a standard 8-iron club was obtained by using test conditions for a Titleist NXT Tour® golf ball that gives a ball speed of about 114 to about 116 miles/hour, a launch angle of about 18.5 to about 19.5 degrees and a spin rate of about 8350 rpm to about 8550 rpm. Thus, in one embodiment, the spin rate of a golf ball with an average, cleanly struck 8-iron shot is between 5500 rpm and 10,000 rpm. In preferred embodiment, the spin rate of a golf ball of the invention with an average, cleanly struck 8-iron shot under the same test conditions is between 7500 rpm and 9500 rpm, more preferably between about 7700 rpm and 9300 rpm.

For a full wedge ball spin test, a spin rate of a golf ball struck by a standard full wedge was obtained by using test conditions for a Titleist NXT Tour® golf ball that gives a ball speed of about 93 to about 95 miles/hour, a launch angle of about 24 to about 25 degrees and a spin rate of about 9650 rpm to about 9850 rpm. Thus, in one embodiment, the spin rate of a golf ball with an average, cleanly struck full wedge shot is between 8000 rpm and 12,000 rpm. In preferred embodiment, the spin rate of a golf ball of the invention with an average, cleanly struck full wedge shot under the same test conditions is between 8500 rpm and 11,500 rpm, more preferably between about 9000 rpm and 11,000 rpm.

For a half wedge ball spin test, a spin rate of a golf ball struck by a standard half wedge was obtained by using test conditions for a Titleist NXT Tour) golf ball that gives a ball speed of about 52 to about 54 miles/hour, a launch angle of about 32 to about 34 degrees and a spin rate of about 5500 rpm to about 7500 rpm. Thus, in one embodiment, the spin rate of a golf ball with an average, cleanly struck half wedge shot is between 5000 rpm and 10,000 rpm. In preferred embodiment, the spin rate of a golf ball of the invention with an average, cleanly struck half wedge shot under the same test conditions is between 6200 rpm and 8,500 rpm, more preferably between about 6500 rpm and 8000 rpm.

Moisture Vapor Transmission

The moisture vapor transmission of a golf ball portion formed from the compositions of the invention may be expressed in terms of absorption, e.g., weight gain or size gain over a period of time at a specific conditions, and transmission, e.g., moisture vapor transmission rate (MVTR) according to ASTM E96-00. MVTR refers to the mass of water vapor that diffused into a material of a given thickness per unit area per unit time at a specific temperature and humidity differential. For example, weight changes of a golf ball portion monitored over a period of seven weeks in 100 percent relative humidity and 72° F. help to demonstrate which balls have better water resistance. In one embodiment, the golf ball portions of the invention have a weight gain of about 0.15 grams or less after seven weeks. In another embodiment, the golf balls of the invention have a weight gain of about 0.13 grams or less after a seven-week storage period. In still another embodiment, the weight gain of the golf balls of the invention is about 0.09 grams or less after seven weeks. In yet another embodiment, the weight gain is about 0.06 grams or less after a seven-week period. The golf balls of the invention preferably have a weight gain of about 0.03 grams or less over a seven-week storage period.

Size gain may also be used as an indicator of water resistance. That is, the more water a golf ball takes on, the larger a golf ball becomes due to the water enclosed beneath the outermost layer of the golf ball portion. Thus, the golf balls of the invention preferably have no appreciable size gain. In one embodiment, the size gain of the golf balls of the invention after a seven-week period is about 0.001 inches or less. MVTR of a golf ball, or portion thereof, may be about 2 g/(m2× day) or less, such as about 0.45 to about 0.95 g/(m2× day), about 0.01 to about 0.9 g/(m2× day) or less, at 38° C. and 90 percent relative humidity.

EXAMPLES

The following examples are only representative of the methods and materials for use in golf ball compositions and golf balls of this invention, and are not to be construed as limiting the scope of the invention in any way. All formulations are provided in weight percent of the total composition.

Example 1

Compositions of the Invention Including Multi-Modal Ionomer Blends

Compositions of the invention were formulated as shown below in Table 1 and tested for performance on flex bars to determine the flexural modulus values of the composition as shown in Table 2. The multi-modal ionomer is a bi-modal distribution of magnesium copolymer and terpolymer ionomer having a hardness of 44 Shore D and a flexural modulus of 11,000 psi (commercially available from DuPont). An additional polymer is blended with the multi-modal ionomer. In this example, the additional polymer is either SURLYN® 7940, which is an ethylene/methacrylic acid (E/MAA) copolymer, in which the MAA acid groups have been partially neutralized with lithium ions, having a flexural modulus of 61,000 psi, or SURLYN® 8150, which is an E/MAA copolymer, in which the MAA acid groups have been partially neutralized with sodium ions, having a flexural modulus of 71,000 psi.

Flexural modulus values were tested under ASTM D6272-02.

TABLE 1

| Formulation | Multi-Modal Ionomer | Additional Polymer | Color Additive (by weight of the total composition) |
|---|---|---|---|
| #1 | 10% | SURLYN ® 7940 90% | 5% |
| #2 | 20% | SURLYN ® 7940 80% | 5% |
| #3 | 30% | SURLYN ® 7940 70% | 5% |
| #4 | 40% | SURLYN ® 7940 60% | 5% |
| #5 | 40% | SURLYN ® 7940 60% | — |
| #6 | 60% | SURLYN ® 7940 40% | — |
| #7 | 70% | SURLYN ® 8150 30% | 5% |
| #8 | 80% | SURLYN ® 7940 20% | 5% |

TABLE 2

| Formulation | Flexural Modulus at 40 hours (psi) | Flexural Modulus at 2 weeks (psi) |
|---|---|---|
| #1 | 53,800 | 61,100 |
| #2 | 43,800 | 53,000 |
| #3 | 33,700 | 39,300 |
| #4 | 32,300 | 38,200 |
| #5 | 33,400 | 36,300 |
| #6 | 23,600 | 26,300 |
| #7 | 20,300 | 22,600 |
| #8 | 17,200 | 18,800 |

The flexural modulus values of the compositions containing more multi-modal ionomer had higher flexural modulus values. Alternatively, the compositions of the invention that contained more ionomer resin had higher flexural modulus values.

Example 2

Golf Balls Formed From Multi-Modal Ionomers

Golf balls were formed having an outer cover formed from a bi-modal distribution of magnesium copolymer and terpolymer ionomer having a hardness of 44 Shore D and a flexural modulus of 11,000 psi (commercially available from DuPont), which is abbreviated in the Table 3 as MMI for golf balls A-C. Golf balls D-F were commercially available control balls. The balls were tested for compression, hardness, coefficient of restitution, and spin rate using various clubs.

TABLE 3

| Ball Type | | Comp. | Hardness | COR @ | Spin Rate | Spin Rate | Spin Rate (Half |
|---|---|---|---|---|---|---|---|
| Core | Outer Cover | (Atti) | (Shore D) | 125 ft/s | (Driver) | (8-iron) | Wedge) |
| A 1.55-inch PBD | 0.065-inch thickness MMI | 66 | 48 | 0.780 | 3789 | 9244 | 7598 |
| B 1.55-inch PBD | 0.065-inch thickness MMI | 53 | 48 | 0.778 | 3482 | 8541 | 7205 |
| C 1.59-inch PBD | 0.045-inch thickness MMI | 72 | 50 | 0.798 | 3726 | 9247 | 7614 |
| D 1.55-inch PBD | 0.065-inch thickness 50% Na/50% Li ionomer blend | 92 | 68 | 0.800 | 3052 | 7676 | 4735 |

TABLE 3-continued

| | Ball Type | | Comp. | Hardness | COR @ | Spin Rate | Spin Rate | Spin Rate (Half |
|---|---|---|---|---|---|---|---|---|
| | Core | Outer Cover | (Atti) | (Shore D) | 125 ft/s | (Driver) | (8-iron) | Wedge) |
| E | 1.55-inch PBD | 0.065-inch thickness 50% Na/50% Zn ionomer blend | 76 | 69 | 0.813 | 2925 | 7704 | 4988 |
| F | 1.59-inch PBD | 0.045-inch thickness grafted metallocene-catalyzed polymer blend (FUSABLEND®) | 80 | 58 | 0.807 | 3064 | 8429 | 6416 |

The compositions of the invention produced cover layers that were softer than the control balls. Thus, the spin rates were increased for the golf balls having covers formed of the compositions of the invention as compared to the control balls.

Example 3

Covers Formed of the Compositions of the Invention for a Three-Piece Ball

Compositions of the invention were formulated as shown below in Table 4 and tested for compression, hardness, coefficient of restitution, and spin rate using various clubs as shown in Table 5. As with the previous examples, the multi-modal ionomer (MMI) is a bi-modal distribution of magnesium copolymer and terpolymer ionomer having a hardness of 44 Shore D and a flexural modulus of 11,000 psi (commercially available from DuPont). In this example, SURLYN® 7940, which is an ethylene/methacrylic acid (E/MAA) copolymer, in which the MAA acid groups have been partially neutralized with lithium ions, having a flexural modulus of 61,000 psi, has been blended with the MMI. A control ball having a polyurethane cover was used for comparison purposes. The inner balls for A-E are the same, i.e., a 1.55-inch polybutadiene core having a compression of 70.6 and a coefficient of restitution of 0.809 encased in 0.035-inch thick ionomer inner cover layer.

TABLE 4

| Formulation | Multi-Modal Ionomer | Additional Polymer | Polyurethane |
|---|---|---|---|
| A | 10% | SURLYN® 7940 90% | — |
| B | 20% | SURLYN® 7940 80% | — |
| C | 30% | SURLYN® 7940 70% | — |
| D | 40% | SURLYN® 7940 60% | — |
| Control | — | — | 100% |

TABLE 5

| Ball Type | Comp. (Atti) | Hardness (Shore D) | COR @ 125 ft/s | Spin Rate (Driver) | Spin Rate (8-iron) | Spin Rate (Half Wedge) |
|---|---|---|---|---|---|---|
| A | 87 | 60 | 0.805 | 3100 | 8079 | 6989 |
| B | 86 | 59 | 0.805 | 3096 | 8110 | 7067 |
| C | 86 | 59 | 0.803 | 3187 | 8160 | 7074 |
| D | 83 | 55 | 0.800 | 3296 | 8420 | 7212 |
| Control | 91 | 59 | 0.809 | 3078 | 8220 | 6991 |

As the amount of MMI increased, the cover became softer and the spin rate increased. The control ball had a higher COR.

Example 4

Covers Formed of the Compositions of the Invention for a Two-Piece Ball

Compositions of the invention were formulated as shown below in Table 6 and tested for compression, hardness, coefficient of restitution, and spin rate using various clubs as shown in Table 7. As with the previous examples, the multi-modal ionomer (MMI) is a bi-modal distribution of magnesium copolymer and terpolymer ionomer having a hardness of 44 Shore D and a flexural modulus of 11,000 psi (commercially available from DuPont). In this example, the additional polymer is either SURLYN® 7940, which is an ethylene/methacrylic acid (E/MAA) copolymer, in which the MAA acid groups have been partially neutralized with lithium ions, having a flexural modulus of 61,000 psi, or SURLYN® 8150, which is an E/MAA copolymer, in which the MAA acid groups have been partially neutralized with sodium ions, having a flexural modulus of 71,000 psi. A color additive was present in the composition in an amount of about 5 percent by weight of the total composition.

A golf ball having a metallocene-catalyzed polymer blend cover was used for comparison purposes. The cores for A-E are the same, i.e., a 1.59-inch polybutadiene core.

TABLE 6

| Formulation | Multi-Modal Ionomer | Additional Polymer | Grafted Metallocene-Catalyzed Polymer Blend (FUSABLEND®) |
|---|---|---|---|
| A | 80% | SURLYN® 7940 20% | — |
| B | 60% | SURLYN® 7940 40% | — |

TABLE 6-continued

| Formulation | Multi-Modal Ionomer | Additional Polymer | Grafted Metallocene-Catalyzed Polymer Blend (FUSABLEND ®) |
|---|---|---|---|
| C | 40% | SURLYN ® 7940 60% | — |
| D | 70% | SURLYN ® 8150 30% | — |
| Control | — | — | 100% |

TABLE 5

| Ball Type | Comp. (Atti) | Hardness (Shore D) | COR @ 125 ft/s | Spin Rate (Driver) | Spin Rate (8-iron) | Spin Rate (Half Wedge) |
|---|---|---|---|---|---|---|
| A | 73 | 52 | 0.797 | 3777 | 8238 | 7061 |
| B | 76 | 54 | 0.799 | 3525 | 7966 | 6763 |
| C | 78 | 58 | 0.804 | 3270 | 7749 | 6520 |
| D | 75 | 53 | 0.799 | 3634 | 8067 | 6902 |
| Control | 81 | 60 | 0.810 | 3135 | 7760 | 6320 |

As the amount of MMI increased, the cover became softer, the coefficient of restitution decreased, and the spin rate increased. Golf Ball C, which had the least amount of MMI, was most comparable to the control ball.

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("Mn") or weight average molecular weight ("Mw"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A method of forming a golf ball, comprising the steps of:
providing a golf ball core comprising a thermoset material;
forming an in-situ multi-modal mixture by:
providing a first acid copolymer having a molecular weight of about 70,000 or greater;
providing a second acid copolymer having a molecular weight of about 40,000 or less;
providing a neutralizing agent;
mixing the first acid copolymer, the second acid copolymer, the neutralizing agent, and, optionally, a processing aid, to form the in-situ multi-modal mixture;
providing a thermoplastic polymer;
forming a cover material comprising the multi-modal mixture and about 60 percent to about 90 percent by weight of a thermoplastic polymer, wherein the cover material has a flexural modulus of about 35,000 psi to about 65,000 psi after 2 weeks;
forming a cover disposed about the core with the cover material.

2. The method of claim 1, wherein the cover comprises an inner cover and an outer cover.

3. The method of claim 2, wherein the inner cover comprises the cover material.

4. The method of claim 2, wherein the outer cover comprises the cover material.

5. A method of forming a golf ball, comprising the steps of:
providing a golf ball core comprising a first material;
forming a multi-modal mixture by:
polymerizing in-situ a first acid copolymer having a molecular weight of about 70,000 or greater in the presence of a second acid copolymer having a molecular weight of about 40,000 or less to form an in-situ polymer mixture and an optional third acid copolymer having a molecular weight different from the first and second acid copolymers;
providing a neutralizing agent;
processing the in-situ polymer mixture with the neutralizing agent, and, optionally, a processing aid, to form the multi-modal mixture;
forming a composition by blending the multi-modal mixture with about 60 percent to about 90 percent thermoplastic polymer by weight of the composition, wherein the composition has a flexural modulus of about 35,000 psi to about 65,000 psi after 2 weeks; and
forming a cover disposed about the core with the composition;
wherein the first material differs from the composition.

6. The method of claim 5, wherein the cover comprises an inner cover and an outer cover.

7. The method of claim 6, wherein the inner cover comprises the composition.

8. The method of claim 6, wherein the outer cover comprises the composition.

9. The golf ball of claim 1, wherein the thermoset material comprises polybutadiene.

10. The golf ball of claim 5, wherein the first material comprises polybutadiene.

11. A method of forming a golf ball, comprising the steps of:
providing a golf ball core comprising a thermoset material;

providing a first acid copolymer having a first molecular weight of about 70,000 or greater;

providing a second acid copolymer having a second molecular weight of about 40,000 or less;

providing a neutralizing agent;

forming an in-situ multi-modal mixture comprising the first acid copolymer, the second acid copolymer, the neutralizing agent, and optionally, the processing aid, blending about 60 percent to about 90 percent by weight of an ionomer with the in-situ multi-modal mixture to form a composition, wherein the composition has a flexural modulus of about 35,000 psi to about 65,000 psi after 2 weeks;

forming a layer disposed about the core with the composition resulting in an inner ball; and forming a cover about the inner ball.

12. The method of claim 11, wherein the step of forming a cover comprises casting a polyurethane material about the inner ball.

13. The method of claim 11, wherein the thermoset material comprises polybutadiene.

14. The method of claim 11, wherein the cover comprises polyurethane or polyurea.

15. The method of claim 11, wherein the processing aid comprises an organic acid or organic acid.

16. The method of claim 1, wherein the step of providing a golf ball core comprises providing a core having a diameter ranging from 1.50 to 1.60 inches.

17. The method of claim 16, wherein the step of forming a cover comprises forming a cover having a thickness ranging from about 0.03 inches to 0.07 inches.

18. The method of claim 1, further comprising the steps of providing a third acid copolymer having a molecular weight that differs from the molecular weights of the first and second acid copolymers by at least about 5000 and mixing the third acid copolymer with the first acid copolymer, the second acid copolymer, the neutralizing agent, and, optionally, a processing aid, to form the in-situ multi-modal mixture.

19. The method of claim 5, wherein the molecular weight of the optional third acid copolymer differs from the molecular weights of the first and second acid copolymers by at least about 5000.

20. The method of claim 11, wherein the composition has a flexural modulus of about 37,000 psi to about 62,000 psi after 2 weeks.

* * * * *